Nov. 16, 1948.  W. WORTH  2,453,737
OIL TEMPERATURE CONTROL UNIT
Filed Dec. 11, 1944  4 Sheets-Sheet 1
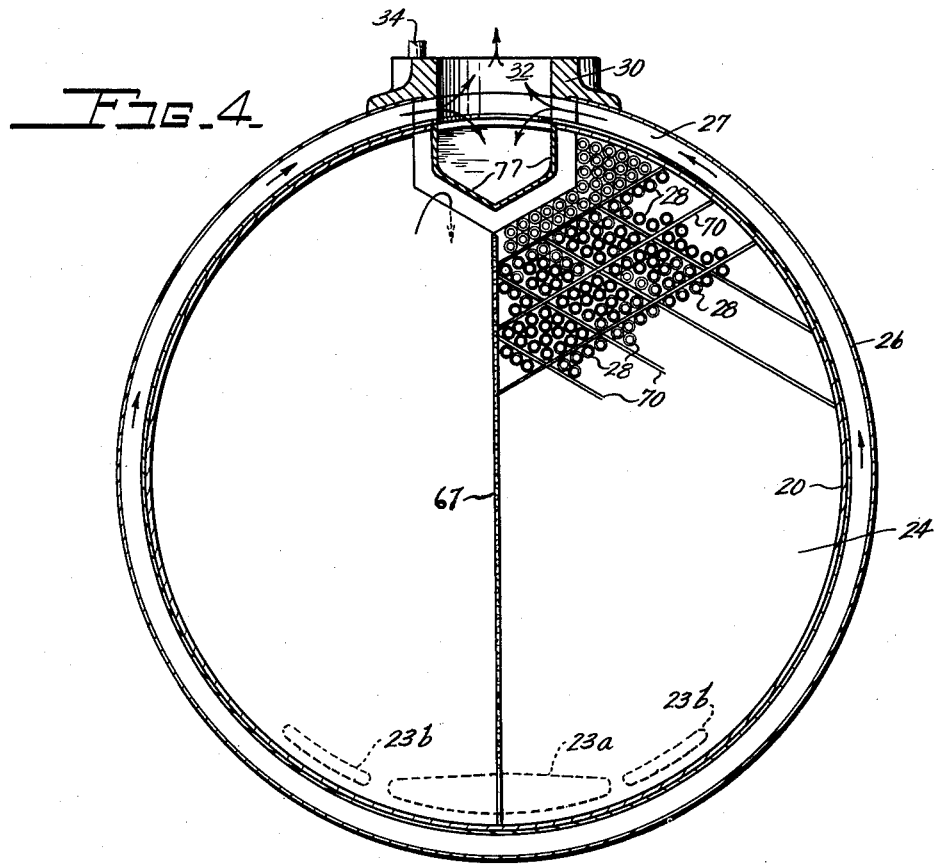
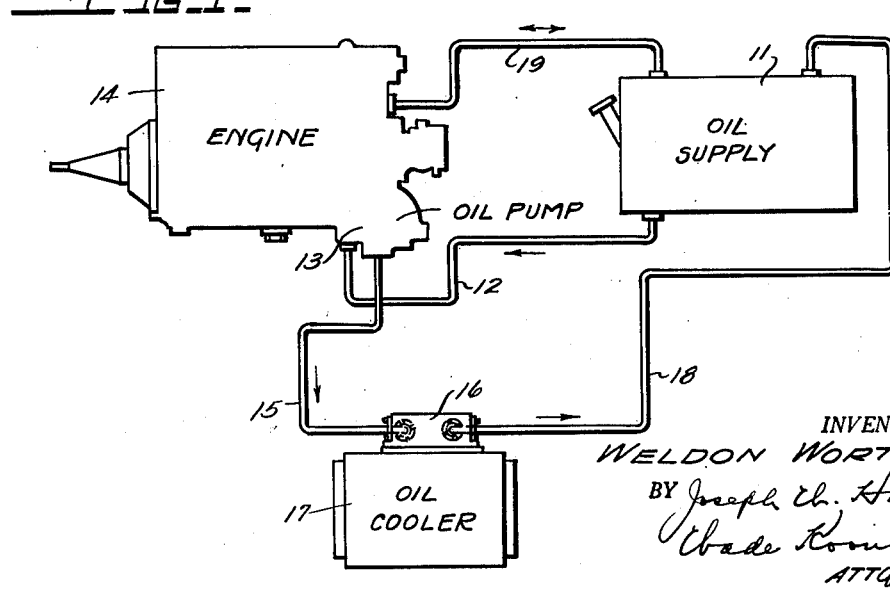
INVENTOR.
WELDON WORTH
BY
ATTORNEYS Nov. 16, 1948.  W. WORTH  2,453,737
OIL TEMPERATURE CONTROL UNIT
Filed Dec. 11, 1944  4 Sheets-Sheet 2
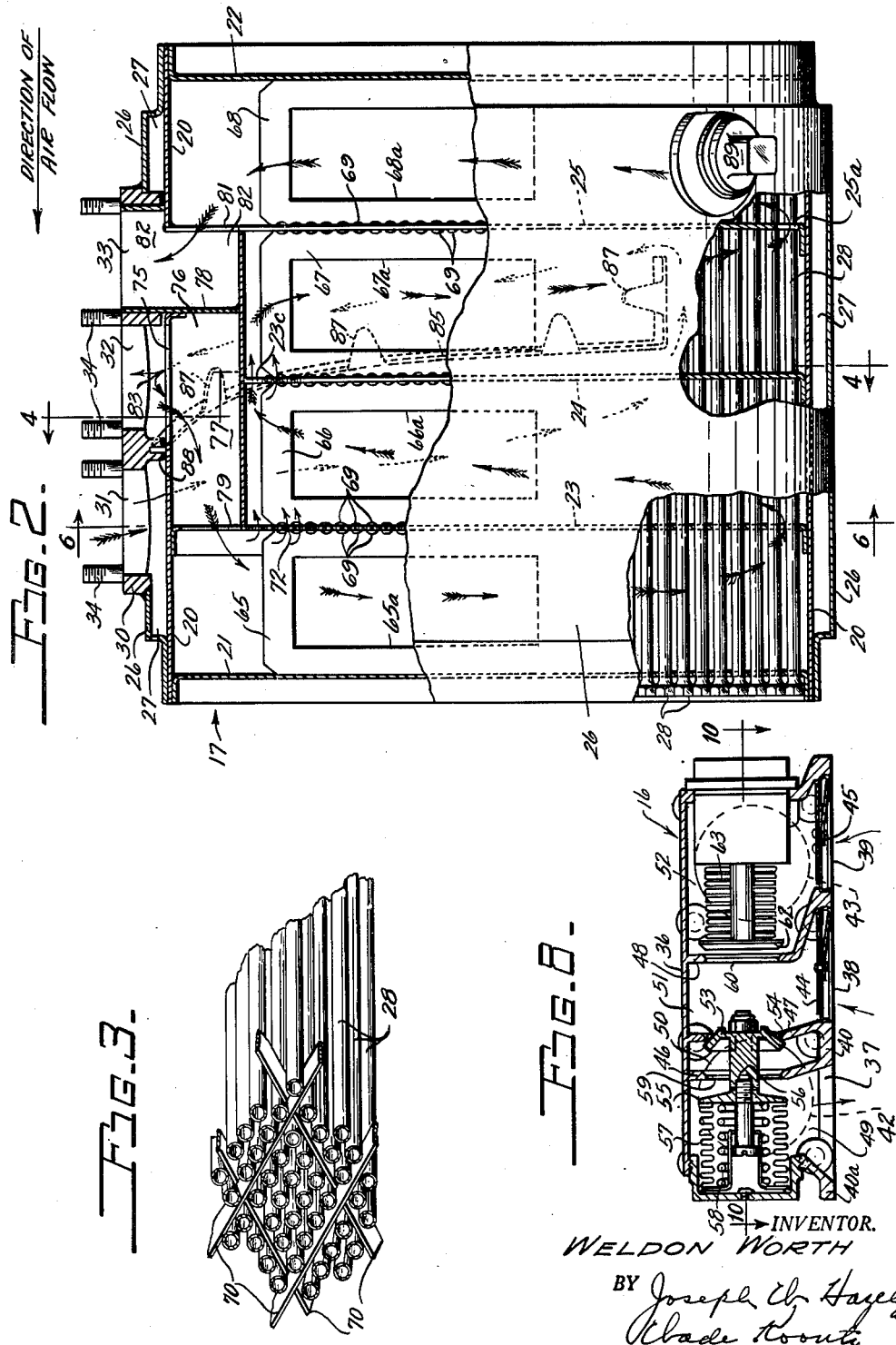
INVENTOR.
WELDON WORTH
BY
ATTORNEYS Nov. 16, 1948.  W. WORTH  2,453,737
OIL TEMPERATURE CONTROL UNIT
Filed Dec. 11, 1944  4 Sheets-Sheet 3

INVENTOR.
WELDON WORTH
BY Joseph Th. Hazell
Clade Koontz
ATTORNEYS

Nov. 16, 1948.　　　W. WORTH　　　2,453,737
OIL TEMPERATURE CONTROL UNIT
Filed Dec. 11, 1944　　　　　　　　4 Sheets-Sheet 4
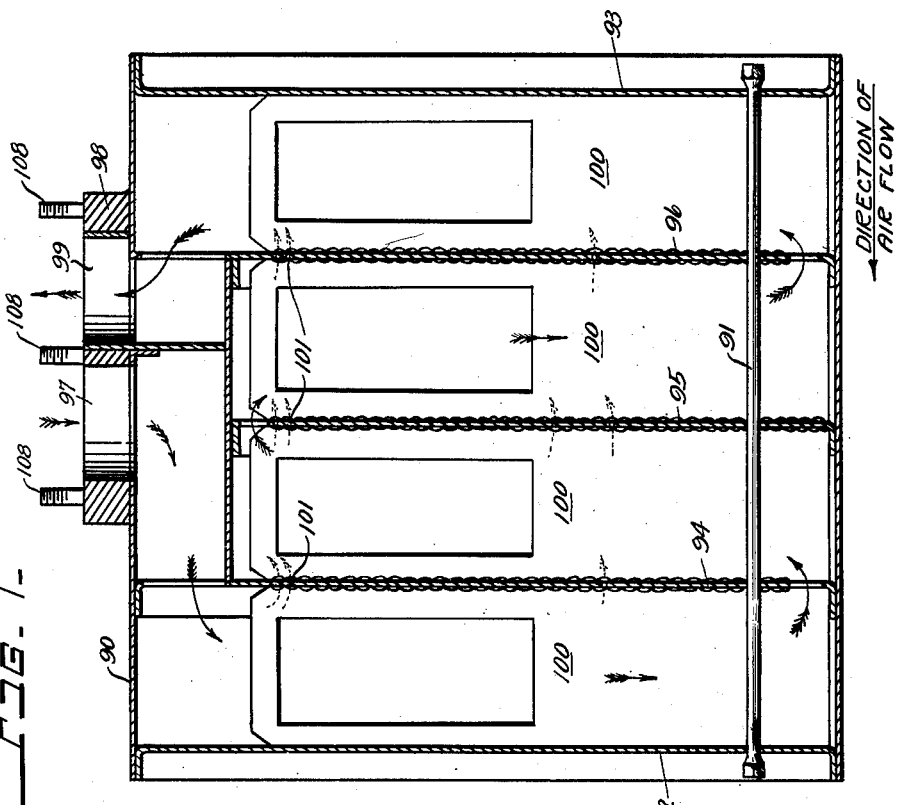
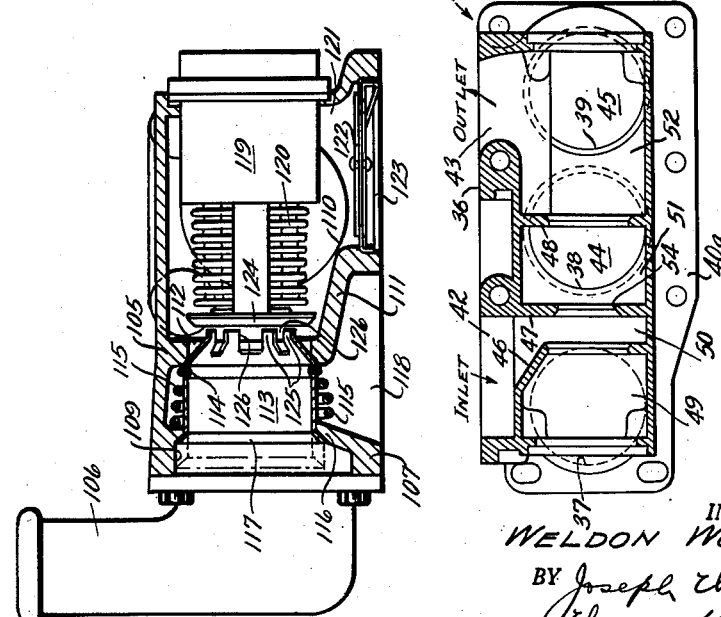
INVENTOR.
WELDON WORTH
BY
ATTORNEYS Patented Nov. 16, 1948

2,453,737

UNITED STATES PATENT OFFICE 2,453,737

OIL TEMPERATURE CONTROL UNIT

Weldon Worth, Dayton, Ohio

Application December 11, 1944, Serial No. 567,764

3 Claims. (Cl. 257—128)

(Granted under the act of March 3, 1883, as amended April 30, 1928; 370 O. G. 757)

The invention described herein may be manufactured and used by or for Government for governmental purposes, without the payment to me of any royalty thereon.

This invention relates to oil temperature control units for regulating the temperature of a circulating lubricant used in internal combustion engines. Such units are especially needed on aircraft, whose engines are subjected to extremes of atmospheric temperature and pressure and also to great variations in load. Several types of oil coolers and oil temperature regulators are in use by the Army Air Forces and the Navy and in all such units the desiderata are a maximum cooling efficiency, a minimum weight, minimum frontal area, minimum flow resistance in the by-pass passage, minimum cooling when the oil is by-passing, maximum effectiveness in establishing flow when the oil is congealed by low temperatures, protection of the cooler from high oil pressures, and in general simplicity and ruggedness.

One of the objects of my invention is to provide a cooler having core tube spacings and arrangements which facilitate the flow of oil through the cooling elements under temperature conditions which would otherwise cause a general congealing of the oil and impair cooling efficiency.

Another object is to provide a cooler with an inlet and an outlet to the core on the same side of the cooler, without any connecting ducts, tubes or passages other than the cooling passes themselves.

Another object is to provide the cooler with heat-conducting members and partial by-pass holes so arranged as to extend the heat and oil flow by conduction and convection from the inlet port and outlet port flanges to and through the various elements of the cooling passage.

Another object is to provide a simplified oil cooler arrangement which eliminates the by-pass passage around or through the cooling elements, thus saving weight and cost and reducing the frontal area and also providing a stronger structural unit.

Other objects and advantages will be apparent from the following description of two embodiments of the invention shown in the accompanying drawings, wherein:

Fig. 1 is a diagram of a typical installation arrangement of an oil cooler, oil supply tank, and internal combustion engine which is to be lubricated;

Fig. 2 is a longitudinal sectional elevation showing a cooler having a by-pass passage formed by an outside jacket;

Fig. 3 is a detail in perspective showing the relationship of certain warm-up strips to the cooler tubes;

Fig. 4 is a cross-sectional view taken on line 4—4 of Fig. 2;

Fig. 7 is a longitudinal sectional elevation showing a modified form of cooler having no by-pass, only one of the cooling or core tubes being shown;

Fig. 8 is a vertical sectional view through a valve unit which may be advantageously used with the cooler of Fig. 2;

Fig. 9 is a vertical sectional view through a valve unit which may be advantageously used with the cooler of Fig. 7; and Fig. 10 is a horizontal sectional view through the valve body, taken on line 10—10 of Fig. 8.

Figure 5:
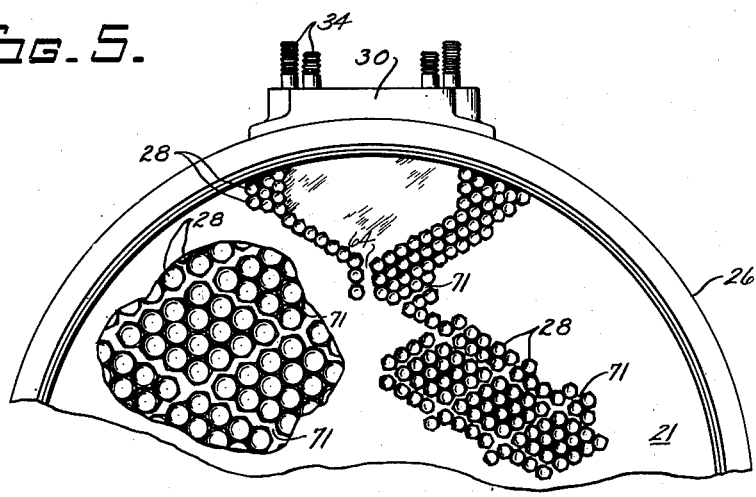
Fig. 5 is a fragmentary end elevation.

The present invention is an improvement over the constructions shown in my Patent No. 2,279,285, dated April 7, 1942, and in my pending application Serial No. 373,150, filed January 4, 1941, now Patent No. 2,419,980, issued May 6, 1947. In companion applications Serial Nos. 567,288 and 567,289, filed December 8, 1944, I claim per se the valve units shown in Figs. 8 and 9.

Referring particularly to the drawings, and first to Fig. 1, the reference numeral 11 designates an oil supply tank in which the lubricating oil supply is stored when not being circulated through the lubricating system. 12 designates the pipe or hose line for conducting oil from tank 11 to the inlet of the engine oil pump 13, which is located on and operated by internal combustion engine 14. After circulating through the engine, the oil is pumped out of the engine and forced through pipe or hose line 15 into the valve unit 16, then enters oil cooler 17 (unless by-passed by the valve unit, as will be explained later), after which the oil passes through valve unit 16 again and through line 18 back to supply tank 11. Valve unit 16 may be either of the units of Figs. 8 and 9, the selection being determined by the type of oil cooler 17 which is used, as the following description will make clear. 19 designates a vent line connecting the air space of the tank to the engine. The described apparatus is merely illustrative and the oil cooler of the invention may be used in other arrangements.

Referring to Figs. 2–6, the oil cooler 17 is shown as a generally cylindrical body having cylindrical side walls 20 and circular end header plates 21, 22 at opposite ends. Between the end header plates are three preferably equally spaced intermediate header plates 23, 24, and 25, all said header plates being parallel to each other and at right angles to the longitudinal axis of cylindrical walls 20. The several header plates are welded or otherwise sealed at their outer edges to the walls 20 and provide passes for the oil, which is forced to follow a circuitous path to expose it to the cooling effect of the core tubes to be described under the desired conditions of flow area and length of flow path. As indicated by the arrows in Fig. 2, there are four passes in that form of the cooler, the first pass being downwardly from the inlet, the second pass being upwardly, the third pass being downwardly, and the fourth pass being upwardly to the outlet of the cooler. While four passes are preferred for one form of cooler, obviously the invention is not limited to any particular number of passes. The intermediate header plates 23 and 25 each have apertures near their lower ends, as indicated at 23a, 23b, Fig. 6, and at 25a, Fig. 2, to permit the oil to flow from one side of each intermediate header plate to the other, while intermediate header plate 24 has similar apertures 23c, Fig. 2, at its upper end, for the same purpose. Arranged outside of walls 20 and welded thereto is a jacket 26 providing a narrow annular by-pass passage 27 which surrounds the cylindrical part of the cooler but is somewhat shorter in length, as shown in Fig. 2. A large number of closely spaced, thin-walled core tubes 28, for passage of cooling air therethrough, are located inside the walls 20 of the cooler, with their axes parallel to the longitudinal axis of the cylindrical body. The oil to be cooled flows through the narrow spaces between the core tubes, and gives up its heat to the walls of the tubes. These tubes are sealed against leakage where they pass through the end header plates 21, 22 and fit tightly in holes in the intermediate header plates 23, 24, 25. The ends of the tubes may project slightly beyond the end header plates, and said projecting ends may be expanded and made hexagonal, with the sides of the hexagons brought together (Fig. 5) so that almost the entire frontal area at one end of the cooler is represented by the tube ends, which ensures the passage through the tubes of a large proportion of the air which strikes that end of the cooler. This specific arrangement is disclosed in Patent No. 2,298,996, dated October 13, 1942, to John E. Woods. In one form of the invention, good results were obtained with core tube diameters of 0.210" to 0.212" and normal tube spacing of 0.040", approximately 1650 core tubes being used in a frontal area of about 1 sq. ft. to provide a total oil cooling surface of about 86 sq. ft. One satisfactory arrangement provides about 40% of the total internal volume of the cooler as a flow space for the oil. All the parts so far mentioned may be of aluminum, aluminum alloy, or other light weight metal.

As shown in Fig. 2, a flange or casting 30 is welded to the top of the cooler unit and provides an inlet port 31, a by-pass outlet port 32, and a main outlet port 33, all of which communicate with passes in the cooler, as will be described. In the preferred arrangement, ports 31 and 32 both communicate with the annular by-pass passage 27. Casting 30 also has a plurality of studs 34 fixed thereto and extending upwardly therefrom to make possible the securing of a valve unit 16 to the top of the cooler. The preferred valve unit is partly shown in Fig. 8 and is claimed per se in the aforesaid companion application Serial No. 567,288 and hence is not described herein in great detail but only to the extent which is necessary for an understanding of the present invention.

The valve unit of Fig. 8 comprises a body 36 having ports 37, 38, 39 in its bottom wall 40 which has a flange 40a with perforations (see Fig. 10) to receive studs 34, after which nuts (not shown) are threaded on the studs to clamp the valve unit body on the cooler. The usual gasket (not shown) is interposed between the flange 30 and the valve unit body to seal the joint. The valve unit body also has an inlet port 42 to which hot oil line 15 is connected, and an outlet port 43 to which oil line 18 is connected, see Fig. 1. Port 37 registers with the cooler inlet port 31, valve port 38 registers with the cooler by-pass port 32 and valve port 39 registers with the cooler outlet port 33. Spring-actuated check valves 44, 45 in the ports 38, 39 respectively permit oil to flow into the valve unit body from the cooler but prevent reverse flow. Three transverse partitions 46, 47 and 48 integral with the valve unit body walls divide said body into four chambers 49, 50, 51, and 52. Oil which enters the valve unit body through its inlet port 42 passes first into chamber 50, in which a spring-actuated valve member 53 is disposed. Normally valve member 53 is seated as shown, closing a port 54 in partition 47. A diaphragm 55 is secured to valve stem 56 and is also secured to one end of a thermostatic element in the form of a metallic bellows 57 whose other end is secured and sealed to the end of the valve unit body. A coil spring 58 is enclosed in the bellows 57 and acts to seat valve member 53. When valve member 53 is seated, oil from chamber 50 flows through port 59 into chamber 49, then through port 37 and through inlet port 31 in the top of the cooler, and thence through the passes or the by-pass of the cooler, before being returned to the valve unit body through port 39 or by-pass port 38. In the event of a surge or even a slow increase in oil pressure to a certain point, diaphragm 55 will be thrust to the left as viewed in the figure, and valve 53 will open port 54 and close port 59, whereupon the oil must flow through port 54 into chamber 51, then through port 60 in partition 48 to chamber 52, and finally out through the outlet port 43. Thus in the event of a surge or a sufficient rise in oil pressure, all the oil entering the valve unit body is automatically by-passed through said body and none of it reaches the cooler, which is therefore protected from damage.

Oil may also enter the valve unit body from the cooler by-pass through port 38, the oil flowing past check valve 44 and into chamber 51, thence through valve port 60, and into chamber 52 and out through outlet 43. This flow is controlled by valve poppet 62, which when seated will stop all flow through port 60, while permitting flow from the outlet port 33 of the cooler through chamber 52 to the outlet 43. The valve poppet 62 is controlled by thermostatic element 63 which expands when a certain temperature is reached and moves the valve poppet 62 into contact with its seat surrounding port 60 to close the by-pass. Element 63 may be a metallic bellows, or the equivalent, and may contain a readily vaporizable liquid, for example ethyl chloride. By the described construction, all oil flowing out of the cooler, whether through the outlet 33 or the by-pass outlet 32 or both, will pass around thermostatic element 63 and hence will subject the latter to its heat. The valve poppet 62 will obviously approach closer and closer to its seat as the oil temperature rises, which will progressively cut down the flow of the oil through the by-pass passage 27 in the cooler and concomitantly increase the flow of oil through the cooler and out through outlet 43. As the passes of the cooler effect cooling of the oil, and as the quantity of oil permitted to flow through the cooling passes varies according to the position of valve 62, it follows that the temperature of the oil itself directly controls the oil flow (the flow decreasing as the temperature drops and increasing as it rises), or in other words, that the temperature of the oil tends to remain constant within narrow and sharply defined limits, assuming that adequate cooling air for the oil cooler is available.

When the engine is first started, the oil throughout the lubricating system (Fig. 1) may be congealed due to low temperatures and this condition may persist in the oil cooler for a considerable time after the aircraft has taken off. If a large part of the oil cooler is made ineffective by congealed oil, most of the oil will either be by-passed through the valve unit or it will continue to circulate through a limited zone in the cooler, and in either case the oil may be insufficiently cooled, and will be returned to the lubricating system at a higher temperature and lower viscosity than are desirable. When the oil cooler is in the condition described above, it is quite important that the cooler be heated to an all-over temperature which will permit it to function as intended, but such heating should be effected without attention from the pilot or engineer, and without employing any external source of heat other than the B. t. u.'s of the oil itself.

In accordance with the invention, central heat-conducting members and warm-up strips are employed in the two forms of coolers herein described. The heat-conducting members 65, 66, 67, and 68 (Fig. 2) are merely thin flat metal plates, perhaps .03 in. thick, each wide enough to fit snugly in the spaces between the end header plates and the adjacent intermediate header plates, and also between the two pairs of intermediate header plates. Each of the heat-conducting members is arranged diametrically of the cooler walls 20, so that all lie in the same plane, and each has a large opening 65a, 66a, 67a, 68a near the upper end and extending for about half the length of the heat-conducting member. The purpose of these openings is to obviate interference with free flow of the oil near the upper portions of the passes in the cooler, as will be clear once the entire cooler construction has been described. The cooler tubes have a central spacing 64 to accommodate the heat-conducting members, as will be understood from Fig. 5. The upper ends of the heat-conducting members are spaced from flange 30 and said members may extend almost to the bottom of the cylindrical body of the cooler, and will conduct heat from the oil in the top of the cooler down to the oil in the bottom thereof, thus helping to thaw out any congealed oil and start flow of the same. The heat-conducting members or plates are preferably held in the described locations by frictional engagement with the end header plates and intermediate header plates, but they may be soldered or otherwise secured. To reduce heat loss to the header plates and hence increase the heat units delivered to the oil, the longitudinal edges of the heat-conducting members preferably are scalloped as indicated at 69.

Figure 6:
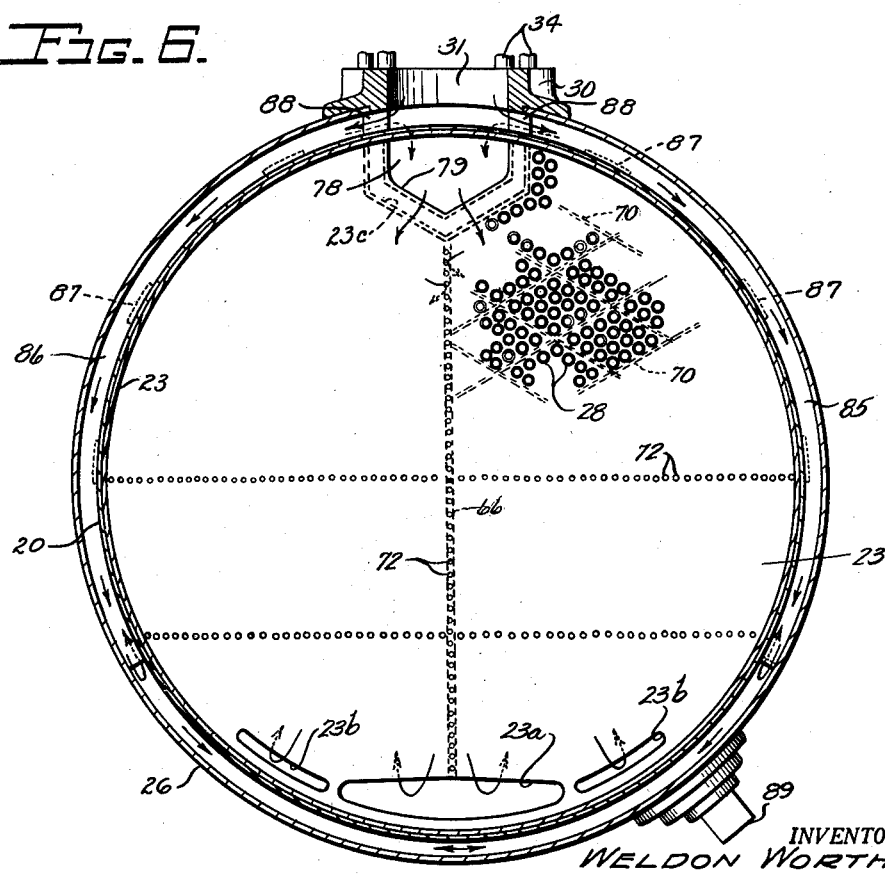
Fig. 6 is a cross-section on line 6—6 of Fig. 2.

The warm-up strips 70 are shown in Fig. 3, and are thin, straight metal strips arranged preferably in a criss-cross or diamond pattern, each set of strips being half way between the walls of the end header plates and the intermediate header plates, also between the intermediate header plates. Thus there are four sets of warm-up strips, when the cooler is constructed to provide four passes as shown. The warm-up strips may be about ½ in. wide and .03 in. thick. The core or cooler tubes 28 are preferably arranged with auxiliary channel spaces 71 between groups of the core tubes. As shown in Figs. 5 and 6, the channel spaces 71 form a diamond pattern, and the warm-up strips lie in these channel spaces, preferably about 1 in. apart, being held between the tubes by friction. Where the warm-up strips cross each other, they may be slitted and interlocked like the cardboard partitions in an egg crate, as will be understood without illustration. The ends of the warm-up strips may contact the heat-conducting members and the inside of the cylindrical shell 20, or may be slightly out of contact with either. The diamond pattern of the auxiliary channel spaces seems to contribute to the maintenance of even flow distribution, and the warm-up strips 70 conduct heat throughout the interior of the cooler to effect a much quicker thawing out of congealed oil than would be possible if these strips are omitted. It will be appreciated that congealed oil spread over the closely adjacent tube surfaces may form definite insulating barriers to heat and that the warm-up strips in effect provide short circuits for the heat of the oil in the top of the cooler, permitting that heat to flow in all directions even though masses of congealed oil may block heat flow between the tubes. The warm-up strips 70 obviously co-operate with the heat-conducting plates 65—68 to effect the same result. It will be clear that the diamond pattern of the auxiliary channel spaces 71 may be employed without the warm-up strips.

To increase the rapidity with which the congealed oil in the lower part of the cooler is warmed up, a considerable number of auxiliary warm-up paths are provided by holes 72 in the intermediate header plates. These holes 72 are termed "partial by-pass" holes because they partially by-pass the oil, forming short circuits for the oil between adjacent passes. Normally holes 72 are arranged in straight lines and extend from points adjacent flange 30 to points near the bottom ends of the header plates. In Fig. 6, only one vertical row of these partial by-pass holes is shown, but several such rows are preferably used, and one or more horizontal rows of such holes may also be provided. The effect of these holes is to permit a small flow of the oil to take place between the passes on opposite sides of a header plate even when the lower part of the cooler is completely sealed off, as it were, by congealed oil. As flow is established through each hole, the hole adjacent thereto will start to pass oil, since each local oil flow will tend to warm adjacent zones of oil, and the header plates themselves will conduct heat downwardly to thaw out congealed oil spread over the surfaces of the header plates.

It will be understood that many different arrangements of the auxiliary by-pass holes may be resorted to and that rows of vertical and horizontal holes, as shown, are unnecessary for a proper functioning of the apparatus. Furthermore, the number of rows of holes 72 may be varied, and the sizes of the individual holes may be increased or decreased, to give best results with the grade of oil used in the lubricating system. The important thing is that minor or local flows be permitted between the passes, that the total volume of oil of these flows shall be but a small fraction of the major flows through the passes, and that the permissible minor flows be sufficiently close to one another to make it possible for one minor flow to start another such flow through an adjacent hole. In other words, the adjacent by-pass holes will not be so far apart that the congealed oil between them will form an insulating blanket preventing early establishment of flow through the holes previously closed. In one example the by-pass holes are located at ¼ in. intervals and have diameters of approximately .056 in.

Hot oil enters the cooler through port 31 when such flow is permitted by the position of valve 53, and flows through the by-pass chamber 27 in either direction as indicated in Fig. 6, returning to the top of the cooler beneath by-pass outlet 32, see Fig. 2. If said outlet 32 is closed (as it will be when the oil flowing through the valve unit body 16 is warm enough to require cooling), all the oil in the cooler will flow through an opening 75 in the cylindrical wall, thence into a chamber 76 (which is formed by side walls 77, wall 78, and the upper portion of header plate 23), then through an opening or port 79 provided in header plate 23 and into the first pass as indicated by the large arrow. The principal flow proceeds through the second, third, and fourth passes, as likewise indicated, passing out through opening 81 in the top of intermediate header plate 25 and then through outlet 33 to the valve unit body. Walls 82, 78, and the top end of header plate 25 may together define the cooler passageway which leads to outlet 33. If by-pass outlet 32 is partly open, part of the hot oil will flow through the cooler passes as just described, but part of the oil flow will divide approximately at the oil flow division point 83 and will flow out of outlet 32 past check valve 44 to the valve unit body as previously described.

If the valve unit is subjected to great increase in oil pressure, valve member 53 will close against its other seat, which will entirely stop flow of oil into cooler inlet 31, and all the oil will flow through the valve unit body. But as soon as normal pressure conditions are restored, oil flow is governed by the position of valve poppet 62, which in turn is controlled by the thermal-responsive element 63 which is directly in the path of the oil flowing out of outlet 33. As the oil temperature rises, valve poppet 62 approaches its seat, permitting less flow through the by-pass passage 27, and as said temperature drops, a larger and larger fraction of the total oil flow may pass through the unrestricted by-pass passage, before reaching the valve unit through by-pass outlet 32. Because the passes of the oil cooler are greatly obstructed by the cooler tubes and other elements described above, whenever the by-pass passage is free to take the oil flow, practically no oil will flow through the passes of the oil cooler even though the latter are not shut off by a valve.

To direct the oil into the desired paths through the by-pass passage, a pair of arcuate and transversely curved baffles 85, 86 are welded or otherwise secured by integral flanges or tabs 87 to the outside of cylindrical shell 20. The upper end of each baffle 85, 86 is secured to a projection 88 which preferably is integral with flange 30 and projects downwardly from a point between inlet 31 and by-pass outlet 32 into contact with shell 20, thereby preventing oil entering the inlet from passing directly out through by-pass outlet 32. The lower end of each baffle 85, 86 is bent substantially at right angles and terminates preferably at a point above the uppermost part of openings 25a but well below the medial horizontal plane which coincides with the longitudinal axis of the cooler. The two baffles 85, 86 together with baffle 88 may subtend an angle of about 240°. Each baffle 85, 86 is in contact with the outer cylindrical wall 20 and the inner cylindrical wall 26 throughout its length, so that no oil entering the by-pass passage 27 can flow directly out through by-pass outlet 32, but must first flow down past the lower bent end of either baffle 85, 86, as indicated by the dotted arrows, before turning and flowing up to outlet 32.

To permit draining and cleaning the cooler, a drain plug 89 may be screwed into the wall 26 and into wall 20 also (not shown) with appropriate gaskets to seal the joints.

Referring to Fig. 7, the simplified form of cooler there shown has no by-pass passage around the shell of the cooler, the by-passing action being obtained by means of a valve unit such as the one shown in Fig. 9 and more fully disclosed in copending application Serial No. 567,289. The oil cooler body 90 of Fig. 7 is cylindrical or nearly so, and has a large number of cooler tubes 91, only one of which is shown, extending parallel to the longitudinal axis of the cooler body and passing through end header plates 92, 93 and intermediate header plates 94, 95, and 96. The header plates are all parallel and at right angles to said longitudinal axis, and provide four passes for the oil as it flows from inlet 97 in flange 98 to outlet 99. Heat conducting members 100 (like members 65—68, Fig. 2) are arranged diametrically of the cooler, and provide short paths for heat flow from the top part of the cooler to the bottom. Warm-up strips (not shown) like those of Fig. 3 may also be used. Partial by-pass holes 101 provide auxiliary warm-up paths for the oil. The construction and function of the parts of Fig. 7 are thus like the form of Fig. 2 except that the by-pass passages and outlet are omitted.

Referring to Fig. 9, the preferred valve unit for use with the cooler of Fig. 7 consists of a body 105 having an elbow 106 secured thereto to connect the valve unit body with the hot oil line 15, Fig. 1. A bottom flange 107 integral with body 105 has bores (not shown) to receive studs 108 on flange 98, thus to secure the valve unit on the top of the cooler with a gasket (not shown) to seal the joint. Body 105 is formed with an inlet 109 at one end and an outlet 110 near the other end, the oil line 18 being coupled to said outlet by any well known means not shown. A transverse partition 111 is located intermediate the ends of body 105 and has a port 112 on which a tubular valve 113 seats as shown. Tubular valve 113 is preferably a removable sheet metal member with a circular groove 114 for receiving one end of a coil spring 115, the other end of said spring abutting an annular flange or shoulder 116 near the inlet 109. Adjacent shoulder 116 the tubular valve 113 has a flared end 117, and said flared end abuts the shoulder 116 to limit movement of valve 113 in one direction, responsive to expansion of the spring. A port 118 in the walls of body 105 is sealed when the tubular valve 113 is seated as shown, so that no flow of oil can then enter the cooler through inlet 97, which registers with port 118. However, a removable thermal-responsive valve 119 having a thermal element 120 is secured in chamber 121, which is on the other side of partition 111 from the tubular valve 113. When the oil passing through the valve body 105 is cool or cold, thermal element 120 will be retracted as shown, and oil then flows from inlet 109 through valve 113 and port 112, into chamber 121 and out through outlet 110, no portion of the oil passing into the cooler. A spring-pressed check valve 122 in port 123 prevents oil in chamber 121 from entering the cooler through outlet 99. As the oil warms up, thermal element 120 expands, moving valve popet 124 closer to port 112. The adjacent end of tubular valve 113 projects through port 112 into chamber 121 and has spaced fingers 125, whose extremities are contacted by valve poppet 124 when the latter is moved far enough by the thermal element. Thus expansion of the thermal element will automatically lift the tubular valve off its seat and when it is so lifted, the wide spaces 126 between fingers 125 will permit the oil flowing through the inlet 109 to pass through the tubular valve to port 118, thence into inlet port 97 of the cooler, through the several cooler passes and out through outlet 99, past check valve 122 into chamber 121, and so on. The valve poppet 124 of course seals port 112 when seated for full flow of oil into the cooler. Intermediate positions of valve poppet 124 control flow of oil into the cooler in accordance with oil temperatures.

The foregoing description in connection with the drawings will make it clear that all the above stated objects of the invention may be attained. It will be understood that the closer the tubes are spaced, the more difficult it will be to establish flow through all the passes, once the oil has congealed in the cooler. On the other hand, if the tubes are spaced apart widely, while full flow will be quickly established, the cooling effect of air, especially cold air, will be little. In short, different cooler tube spacings and different warm-up strip and heat-conducting plate arrangements are necessary for different climates and operating conditions. Therefore I do not wish to be limited to any precise construction and arrangement of parts, but only as required by a fair interpretation of the appended claims.

What I claim is:

1. In an oil cooler of the type having a body provided with an inlet and an outlet for the oil, both the inlet and the outlet being at the top of the body, and also having a multiplicity of cooling tubes within the body, each open end to end for the passage of cooling air and each being parallel to the longitudinal axis of the body and all being below said inlet and outlet, so that oil from the inlet may pass down over the outer surfaces of the tubes and may be cooled thereby; a plurality of header plates arranged transversely of the longitudinal axis of the cooler body, said cooling tubes passing through the header plates, said header plates providing a plurality of passes for directing flow of oil downwardly from the inlet to the bottom of the cooler and upwardly to the outlet of the cooler; and a plurality of heat-conducting members made of thin metal of good conductivity, each heat-conducting member being located between and in edgewise contact with two of the header plates and having an edge reduced in its plate-contacting area to reduce heat loss to the plate, and all the heat-conducting members lying in substantially the same plane though separated by the header plates; each heat-conducting member extending from a point near the top of the cooler to a point near the bottom thereof.

2. The invention according to claim 1, wherein at least some of the edges of the heat-conducting members where in contact with the header plates are scalloped to reduce the heat loss from the heat-conducting members to the header plates, and the upper ends of the heat-conducting members have large openings for free passage of oil, the remaining portions of the heat-conducting members being imperforate.

3. In the combination of claim 1, the further improvement which consists in a plurality of thin, flat, metallic heat-conducting strips arranged in a criss-cross or diamond pattern between the cooling tubes and between the several pairs of header plates and on each side of the heat-conducting members, the cooling tubes being spaced apart at regular intervals in a criss-cross or diamond pattern to accommodate said strips.

WELDON WORTH.

REFERENCES CITED

The following references are of record in the file of this patent:

UNITED STATES PATENTS

| Number | Name | Date |
|---|---|---|
| 709,416 | Maybach | Sept. 16, 1902 |
| 956,211 | Snow | Apr. 26, 1910 |
| 2,159,468 | Young et al. | May 23, 1939 |
| 2,343,868 | Dykeman et al. | Mar. 14, 1944 |
| 2,376,198 | Shaw | May 15, 1945 |
| 2,406,203 | Cruzan et al. | Aug. 20, 1946 |

FOREIGN PATENTS

| Number | Country | Date |
|---|---|---|
| 13,003 | Great Britain | June 8, 1904 |
| 479,959 | Great Britain | Feb. 15, 1938 |
| 522,840 | Great Britain | June 26, 1940 |